(12) United States Patent
Park et al.

(10) Patent No.: US 10,186,717 B2
(45) Date of Patent: Jan. 22, 2019

(54) METAL SEPARATION PLATE FOR FUEL CELL STACK AND FUEL CELL STACK HAVING THE SAME

(71) Applicant: Hyundai Steel Company, Incheon (KR)

(72) Inventors: Ji-Young Park, Seoul (KR); Ki-Jung Kim, Gyeonggi-do (KR); Yoo-Taek Jeon, Gyeonggi-do (KR)

(73) Assignee: Hyundai Steel Company, Incheon (KR)

( * ) Notice: Subject to any disclaimer, the term of this patent is extended or adjusted under 35 U.S.C. 154(b) by 223 days.

(21) Appl. No.: 15/031,195

(22) PCT Filed: Jul. 24, 2014

(86) PCT No.: PCT/KR2014/006750
§ 371 (c)(1),
(2) Date: Aug. 2, 2016

(87) PCT Pub. No.: WO2015/060517
PCT Pub. Date: Apr. 30, 2015

(65) Prior Publication Data
US 2016/0372761 A1    Dec. 22, 2016

(30) Foreign Application Priority Data

Oct. 24, 2013  (KR) .................. 10-2013-0126911
Oct. 24, 2013  (KR) .................. 10-2013-0126914

(51) Int. Cl.
*H01M 8/241*       (2016.01)
*H01M 8/0206*     (2016.01)
(Continued)

(52) U.S. Cl.
CPC ....... *H01M 8/0258* (2013.01); *H01M 8/0206* (2013.01); *H01M 8/0267* (2013.01);
(Continued)

(58) Field of Classification Search
CPC ............ H01M 8/0258; H01M 8/0206; H01M 8/0267; H01M 8/0271; H01M 8/04067; H01M 8/241; H01M 8/2465
See application file for complete search history.

(56) References Cited

U.S. PATENT DOCUMENTS

| 6,299,999 | B1  |        | 10/2001 | Buchner et al. |
| 8,450,023 | B2  | *      | 5/2013  | Conti .................. H01M 8/0267 |
|           |     |        |         | 429/452 |

(Continued)

FOREIGN PATENT DOCUMENTS

| JP | 2005116404 A | 4/2005 |
| JP | 2005340179 A | 12/2005 |

(Continued)

OTHER PUBLICATIONS

International Search Report issued by the Korean Intellectual Property Office, acting as ISA, in corresponding PCT/KR2014/006750 International Application, dated Oct. 6, 2014.

(Continued)

*Primary Examiner* — Gregg Cantelmo
(74) *Attorney, Agent, or Firm* — Locke Lord LLP; Daniel J. Fiorello

(57) ABSTRACT

Disclosed are a metal separation plate for a fuel cell stack, which includes protrusion patterns each having an air path opened in a short-side direction or protrusion patterns each having an air path of which one side is opened and the other side is closed, and can not only improve cooling performance and stack performance without a separate cooling plate mounted therein, and but also improve humidification performance of a membrane electrode assembly (MEA) by blocking moisture leaking from the inside of the closed air paths, and a fuel cell stack having the same.

12 Claims, 13 Drawing Sheets

(51) Int. Cl.
*H01M 8/0258* (2016.01)
*H01M 8/0267* (2016.01)
*H01M 8/0271* (2016.01)
*H01M 8/2465* (2016.01)
*H01M 8/04007* (2016.01)

(52) U.S. Cl.
CPC ..... *H01M 8/0271* (2013.01); *H01M 8/04067* (2013.01); *H01M 8/241* (2013.01); *H01M 8/2465* (2013.01)

(56) References Cited

U.S. PATENT DOCUMENTS

2007/0015035 A1* 1/2007 Izenson ............... H01M 8/0206 429/444
2009/0098432 A1* 4/2009 Rosenberg ............. F28F 13/12 429/444

FOREIGN PATENT DOCUMENTS

| | | |
|---|---|---|
| JP | 2006107968 A | 4/2006 |
| JP | 2006-179404 A | 7/2006 |
| JP | 2009104922 A | 5/2009 |
| JP | 2009526347 A | 7/2009 |
| JP | 2010153157 A | 7/2010 |
| JP | 2012048940 A | 3/2012 |
| JP | 2012248460 A | 12/2012 |
| KR | 10-2003-0042633 | 6/2003 |
| KR | 10-0658289 B1 | 12/2006 |
| KR | 10-0938023 B1 | 1/2010 |

OTHER PUBLICATIONS

Japanese Office Action dated Feb. 28, 2017, issued in corresponding Japanese Patent Application No. 2016-525538.

* cited by examiner

METAL SEPARATION PLATE FOR FUEL CELL STACK AND FUEL CELL STACK HAVING THE SAME

CROSS REFERENCE TO RELATED APPLICATIONS

This application is the national phase under 35 U.S.C. § 371 of PCT International Application No. PCT/KR2014/006750, filed Apr. 27, 2014, which claims the benefit of and priority to Korean Patent Application No. 10-2013-0126911 filed Oct. 24, 2013 and Korean Patent Application No. 10-2013-0126914 filed Oct. 24, 2013. The entire contents of this patent application are hereby incorporated by reference herein.

TECHNICAL FIELD

The present invention relates to a metal separation plate for a fuel cell stack and a fuel cell stack having the same, and more particularly, to a metal separation plate for a fuel cell stack, which includes protrusion patterns each having an air path opened in a short-side direction or protrusion patterns each having an air path of which one side is opened and the other side is closed, and can not only improve cooling performance and stack performance without a separate cooling plate mounted therein, and but also improve humidification performance of a membrane electrode assembly (MEA) by blocking moisture leaking from the inside of the closed air paths, and a fuel cell stack having the same.

BACKGROUND ART

A fuel cell refers to a device that electrochemically generates electricity using hydrogen gas and oxygen gas. More specifically, the fuel cell converts hydrogen and air, which are continuously supplied from outside, into electrical energy and thermal energy through an electrochemical reaction.

Such a fuel cell generates power using an oxidation reaction in an anode and a reduction reaction in a cathode. At this time, a membrane electrode assembly (MEA) including a catalyst layer and a polymer electrolyte membrane is used in order to promote oxidation and reduction reactions, the catalyst layer including platinum or a platinum-ruthenium alloy. A conductive separator is coupled to both ends of the MEA so as to form a cell structure.

Since a unit cell of the fuel cell has a low voltage, the practical utility thereof is inevitably low. Thus, several or several hundred unit cells are generally stacked and used. When unit cells are stacked, a metal separation plate serves to electrically connect the respective unit cells and separate a reaction gas.

A general metal separation plate for a fuel cell includes a reaction gas channel and a cooling water channel, which are formed in the center of a rectangular metal plate, and a gasket surrounding the reaction gas channel and the cooling water channel. The reaction gas channel and the cooling water channel may be collectively referred to as a channel part. Typically, the reaction gas channel is formed through a stamping process which is performed from the front surface to the rear surface of the metal plate, and the cooling water channel is formed by utilizing an area between the reaction gas channels protruding from the rear surface of the metal plate. According to the structure of the channel part, a reaction gas may flow on the front surface of the metal plate, and cooling water may flow on the rear surface of the metal plate. For this reason, the front surface of the metal plate may be referred to as a reaction gas flowing surface, and the rear surface of the metal plate may be referred to as a cooling water flowing surface.

The metal separation plate has a water-cooled structure in which cooling water introduced into a cooling water introduction manifold at one side of the channel part cools heat while passing through the cooling water channel, the heat being generated by an activation loss, reduction reaction in the anode, and Joule heating, during operation of the fuel cell. The cooling water having passed through the cooling process is discharged to the outside of the metal separation plate through a cooling water discharge manifold at the other side of the channel part.

In the case of the water-cooled metal separation plate, cooling water must be continuously supplied to the metal separation plate in order to cool the heat generated during the operation of the fuel cell. In this case, the water-cooled metal separation plate requires a pump for supplying cooling water, a deionizer, a heat exchanger and the like, thereby increasing the manufacturing cost of a fuel cell system. On the other hand, an air-cooled metal separation plate has an effect of reducing the manufacturing cost of a fuel cell system.

However, the air-cooled metal separation plate has a total of two cathode layers which include a cathode separation plate for supplying air and a cooling plate for securing a space in the vertical direction to smoothly supply air, the cooling plate serving as a cooling fin. In this case, since the cooling plate is additionally required, the entire volume and manufacturing cost of a fuel cell stack are inevitably increased.

The related art of the present invention is disclosed in Korean Patent Laid-open Publication No. 10-2003-0042633 published on Jun. 2, 2003, and provides a fuel cell stack which includes a cooling plate having an air-cooled structure and stacked between unit cells.

SUMMARY OF THE INVENTION

Embodiments of the present invention are directed to a metal separation plate for a fuel cell stack, which includes an opened air path capable of improving cooling performance and stack performance without a separate cooling plate mounted therein, and a fuel cell stack having the same.

Also, embodiments of the present invention are directed to a metal separation plate for a fuel cell stack, which is capable of not only smoothly supplying reaction gas and improving cooling performance and stack performance without a separate cooling plate mounted therein, but also improving humidification performance of a membrane electrode assembly (MEA) by blocking moisture from leaking from the inside of closed air paths, and a fuel cell stack having the same.

TECHNICAL SOLUTION

In an embodiment, a metal separation plate for a fuel cell stack may include: a metal separation plate body including: a channel part having protrusion patterns protruding in a direction from bottom to top, separated from each other while forming a matrix shape, and partially cut to have an air path opened in a short-side direction; and a manifold part having a reaction gas inlet and a reaction gas outlet which are disposed at both side edges of the channel part, respectively; and a gasket including: a first gasket formed along the edge of the manifold part on the top surface of the metal separation plate body; and second gaskets disposed at the edge of the channel part and having an island structure in which the second gaskets are alternately arranged with the protrusion patterns.

In another embodiment, a fuel cell stack may include: two or more metal separation plates; and an MEA interposed between the respective metal separation plates, wherein the two or more metal separation plates include a metal separation plate for a cathode and a metal separation plate for an anode, the metal separation plate for a cathode has protrusion patterns protruding in a direction from bottom to top, separated from each other while forming a matrix shape, and partially cut to have an air path opened in a short-side direction, the air path being formed in the shape of draw bead and having a width of 3 to 5 mm, and the metal separation plate for an anode has a reaction gas flow path protruding in a direction from top to bottom, and formed along the long-side direction crossing the air paths of the protrusion patterns.

In another embodiment, a metal separation plate may include: a metal separation plate body including: a channel part having protrusion patterns protruding in a direction from bottom to top, separated from each other while forming a matrix shape, and partially cut to have an air path of which one side is opened along a short-side or long-side direction and the other side is closed; and a manifold part having a reaction gas inlet and a reaction gas outlet which are disposed at both side edges of the channel part, respectively; and a gasket including: a first gasket formed along the edge of the manifold part on the top surface of the metal separation plate body; and second gaskets disposed at the edge of the channel part and having an island structure in which the second gaskets are alternately arranged with the protrusion patterns.

In another embodiment, a fuel cell stack may include: two or more metal separation plates; and an MEA interposed between the respective metal separation plates, wherein the two or more metal separation plates include a metal separation plate for a cathode and a metal separation plate for an anode, the metal separation plate for a cathode has protrusion patterns each having an air path of which one side is opened in a short-side or long-side direction and the other side is closed, the air path being formed in the shape of draw bead and having a width of 3 to 5 mm, and the metal separation plate for an anode has a reaction gas flow path protruding from top to bottom, and formed in a shape crossing the air paths of the protrusion patterns.

Advantageous Effects

According to the embodiments of the present invention, the metal separation plate for a fuel cell stack and the fuel cell stack having the same may include the protrusion patterns each having the air path opened in the short-side direction, and the protrusion patterns and the gaskets disposed at the channel region may be alternately arranged in a zigzag shape, thereby minimizing the disturbance of air introduction by the gaskets while minimizing the cooling performance.

Furthermore, since the metal separation plate for a cathode includes the protrusion patterns each having the opened flow path, the metal separation plate for a fuel cell stack and the fuel cell stack having the same can secure excellent cooling performance and stack performance without a separate cooling plate mounted therein. Furthermore, since a separate cooling plate can be omitted, the manufacturing cost and the entire volume can be reduced.

Furthermore, the metal separation plate for a fuel cell stack and the fuel cell stack having the same may include the protrusion patterns each having the air path of which one side is opened and the other side is closed, thereby improving the cooling performance and the stack performance. Furthermore, the metal separation plate may block moisture from leaking from the closed air paths, thereby improving the humidification performance of the MEA.

Furthermore, since the metal separation plate for a fuel cell stack and the fuel cell stack having the same include the protrusion patterns each having the air path which is partially opened, the fuel cell stack can smoothly supply reaction gas and improve cooling performance and stack performance without a separate cooling plate mounted therein. Furthermore, since a separate cooling plate can be omitted, the manufacturing cost and the entire volume can be reduced.

DETAILED DESCRIPTION OF THE PREFERRED EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Hereafter, a metal separation plate for a fuel cell stack and a fuel cell stack having the same in accordance with embodiments of the present invention will be described in detail as follows.

(First Embodiment)

Figure 1:
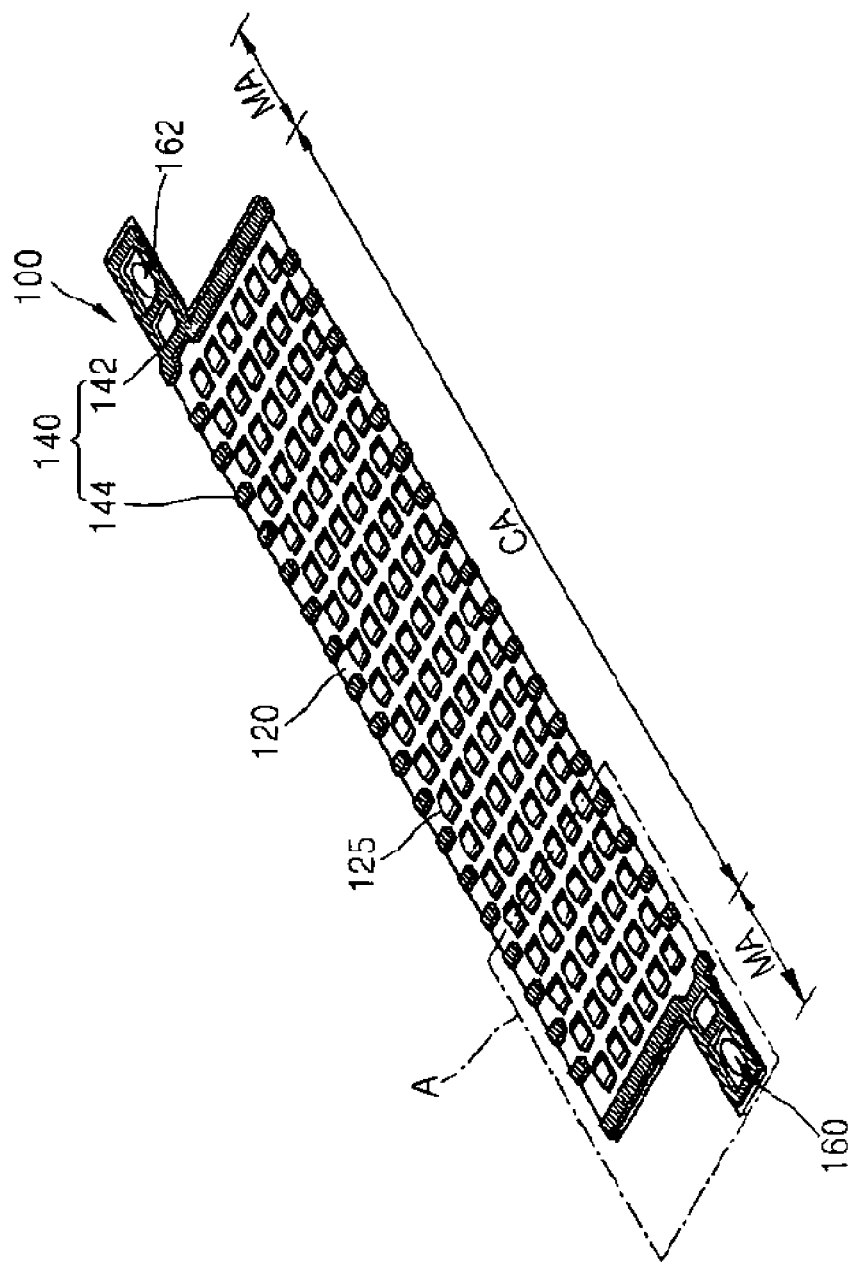
FIG. 1 is a plan view of a metal separation plate for a fuel cell stack in accordance with a first embodiment of the present invention.
Figure 2:
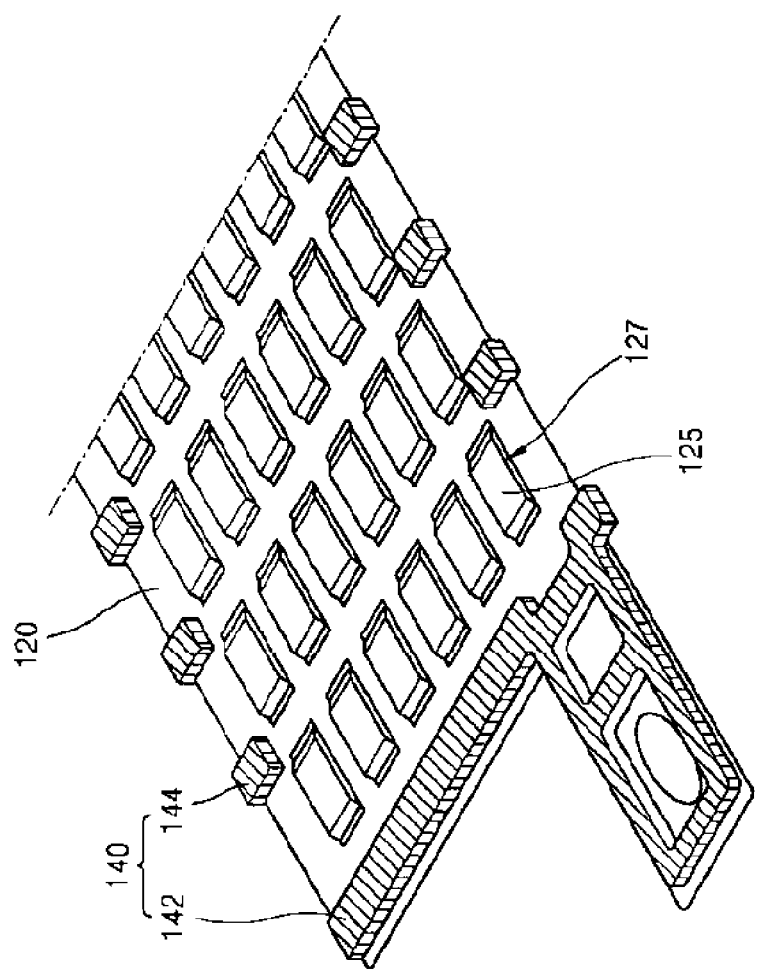
FIG. 2 is an expanded perspective view of a portion A of FIG. 1.

FIG. 1 is a plan view of a metal separation plate for a fuel cell stack in accordance with a first embodiment of the present invention, and FIG. 2 is an expanded perspective view of a portion A of FIG. 1.

Referring to FIGS. 1 and 2, the metal separation plate 100 for a fuel cell stack in accordance with the first embodiment of the present invention may include a metal separation plate body 120 and a gasket 140.

The metal separation plate body 120 may include a channel part CA and a manifold part MA. The channel part CA may include protrusion patterns 125 protruding in a direction from bottom to top, separated from each other while forming a matrix shape, and partially cut to have an air path opened in the short-side direction, and the manifold part MA may include a reaction gas inlet 160 and a reaction gas outlet 162 which are disposed at both side edges of the channel part CA, respectively.

At this time, the protrusion patterns 125 each having the air path 127 may be formed in the shape of a draw bead and have a width of 3 to 5 mm. When the protrusion pattern 125 has a width of less than 3 mm, the amount of air passing through the air path 127 may be decreased to degrade the cooling performance. On the other hand, when the protrusion pattern 125 has a width of more than 5 mm, the distance between the protrusion patterns 125 may be reduced, which makes it difficult to design the patterns.

In particular, the protrusion pattern 125 may be cut in the short-side direction of the metal separation plate body 120, and have the air path 127 opened in the short-side direction of the metal separation plate body 120, but closed in the long-side direction of the metal separation plate body 120. Thus, the air passing through the air path 127 of the protrusion pattern 125 may be introduced from one short side of the metal separation plate body 120, and then discharged to the other short side of the metal separation plate body 120.

The gasket 140 may serve to not only secure air tightness, but also improve the connection force and adhesive force between metal separation plates when two or more metal separation plates are stacked. The gasket 140 may be formed of rubber. However, the present embodiment is not limited thereto, but the gasket 140 may be formed of plastic.

The gasket 140 may include a first gasket 142 and second gaskets 144. The first gasket 142 may be formed along the edge of the manifold part MA on the top surface of the metal separation plate body 120, and the second gaskets 144 may be disposed at the edges of the channel part CA, and have an island structure in which the second gaskets 144 are alternately arranged with the protrusion patterns 125. At this time, the protrusion patterns 125 and the second gaskets 144 may be alternately arranged in a zigzag shape, in order to secure an introduction path of air supplied to the air path 127. When a second gasket 144 is arranged on a straight line overlapping protrusion patterns 125, the second gasket 144 may block the introduction of air supplied to the air paths 127 of the protrusion patterns 125, thereby significantly degrading the cooling performance. Thus, the second gaskets 144 may be disposed at even intervals along the long-side direction of the metal separation plate body 120, and arranged in a zigzag shape so as not to overlap the protrusion patterns 125.

The metal separation plate for a fuel cell stack in accordance with the first embodiment of the present invention may include the protrusion patterns each having the air path opened in the short-side direction, and the protrusion patterns and the gaskets disposed at the channel region may be alternately arranged in a zigzag shape. Thus, the metal separation plate can minimize the disturbance of air introduction by the gaskets, thereby maximizing the cooling performance.

Figure 3:
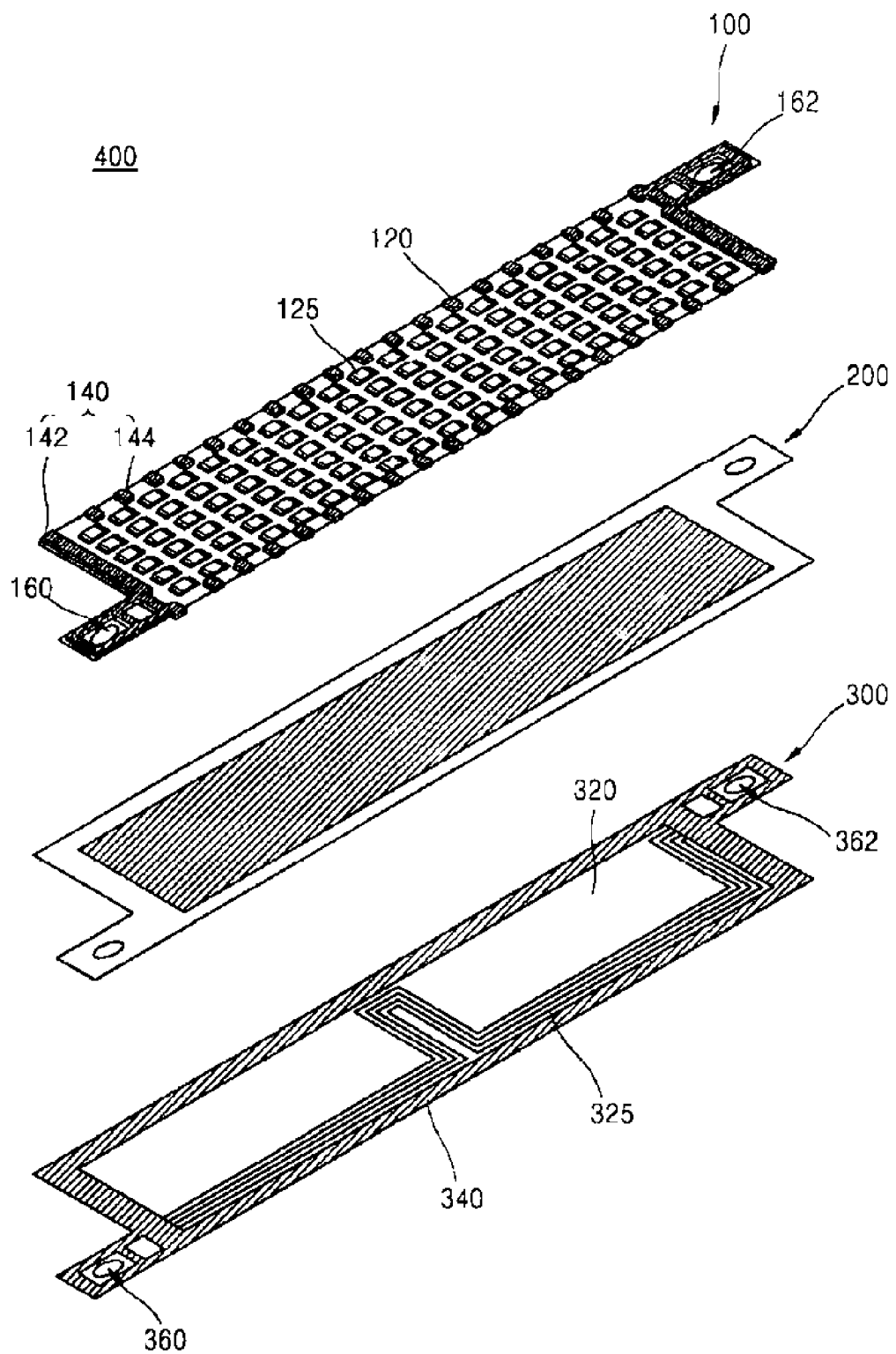
FIG. 3 is an exploded perspective view of a fuel cell stack in accordance with the first embodiment of the present invention.

FIG. 3 is an exploded perspective view of a fuel cell stack in accordance with the first embodiment of the present invention.

Referring to FIG. 3, the fuel cell stack 400 in accordance with the first embodiment of the present invention may include two or more metal separation plates and an MEA 200 interposed between the metal separation plates. At this time, the two metal separation plates may include a metal separation plate 100 for a cathode and a metal separation plate 300 for an anode.

The metal separation plate 100 for a cathode may have protrusion patterns 125 protruding in a direction from bottom to top, separated from each other while forming a matrix shape, and partially cut to have an air path opened in the short-side direction. At this time, the protrusion patterns 125 each having the air path may be formed in the shape of a draw bead so as to have a width of 3 to 5 mm.

Since the metal separation plate 100 for a cathode has substantially the same structure as the metal separation plate for a fuel cell stack in FIGS. 1 and 2, the detailed descriptions thereof are omitted herein.

The metal separation plate 300 for an anode may have a reaction gas flow path 325 protruding in the direction from top to bottom and formed along the long-side direction crossing the air paths of the protrusion patterns 125. Furthermore, the metal separation plate 300 for an anode may have a reaction gas introduction manifold 360 and a reaction gas discharge manifold 362.

The reaction gas introduction manifold 360 may be disposed at a position corresponding to the reaction gas inlet 160 of the metal separation plate 100 for a cathode, and the reaction gas discharge manifold 362 may be disposed at a position corresponding to a reaction gas outlet 162 of the metal separation plate 100 for a cathode.

The metal separation plate 300 for an anode may further include a gasket 340 formed along the edges of a manifold region (not illustrated) and a channel region (not illustrated). The gasket 340 may serve to not only secure air tightness, but also improve the connection force and adhesive force between the metal separation plate 100 for a cathode and the MEA 200.

The MEA 200 may be inserted between the metal separation plate 100 for a cathode and the metal separation plate 300 for an anode. The MEA 200 may include a polymer electrolyte layer and an anode and cathode which are formed on both surfaces of the polymer electrolyte layer, respectively.

Figure 4:
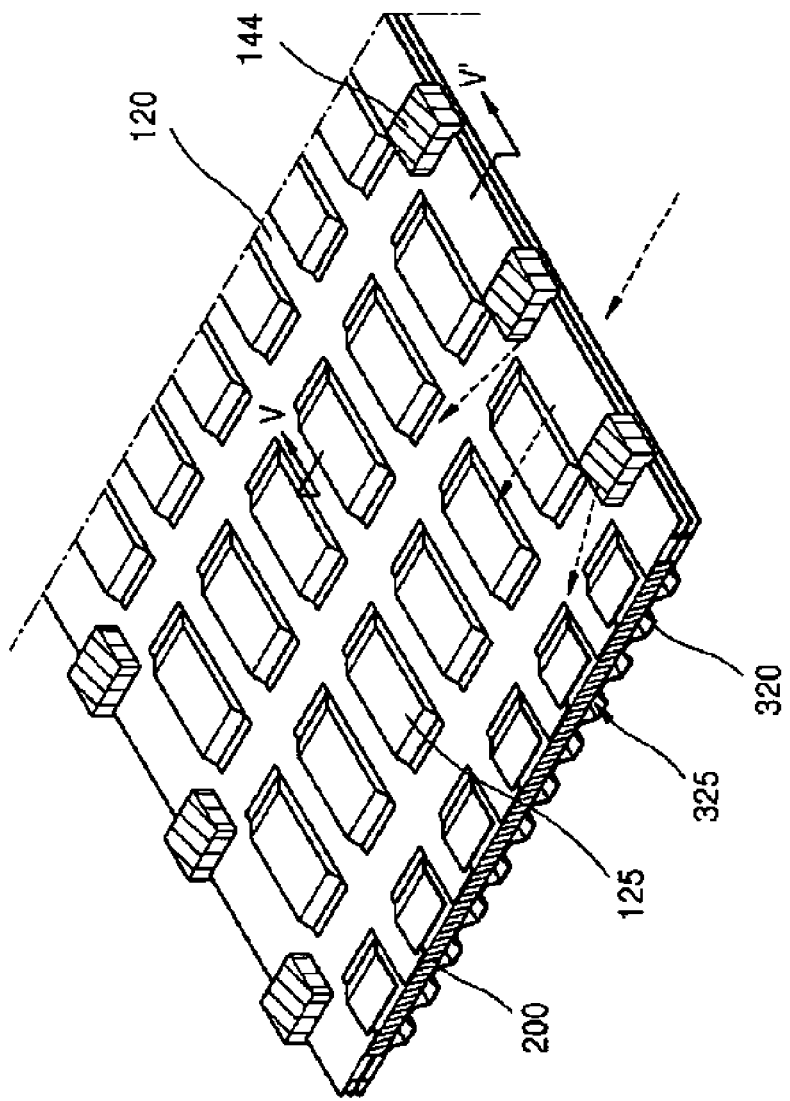
FIG. 4 is an expanded perspective view of a portion of the fuel cell stack in accordance with the first embodiment of the present invention.
Figure 5:
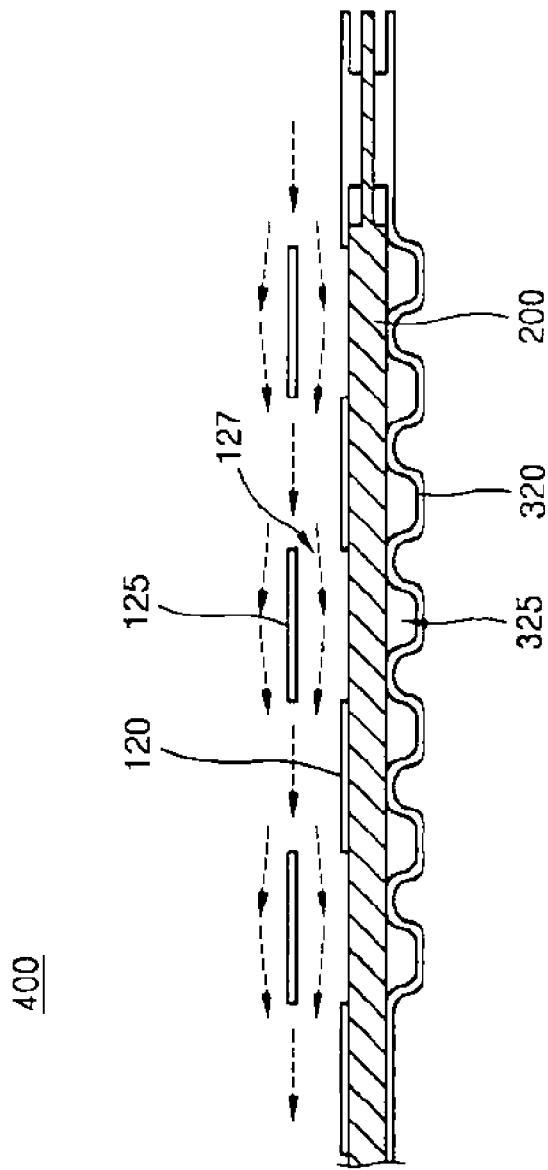
FIG. 5 is a cross-sectional view taken along line V-V' of FIG. 4.

FIG. 4 is an expanded perspective view of a portion of the fuel cell stack in accordance with the first embodiment of the present invention, and FIG. 5 is a cross-sectional view taken along line V-V' of FIG. 4. FIG. 4 is a perspective view of the assembled fuel cell stack, illustrating a surface cut along the central portion of FIG. 3.

As illustrated in FIGS. 4 and 5, the fuel cell stack 400 may have a structure in which the metal separation plate 300 for an anode, the MEA 200 and the metal separation plate 100 for a cathode are sequentially stacked. At this time, the reaction gas flow paths 325 of the metal separation plate 300 for an anode may be arranged in a shape crossing the air paths 127 of the metal separation plate 100 for a cathode.

At this time, since the protrusion patterns 125 of the metal separation plate 100 for a cathode are cut in the short-side direction of the metal separation plate 100, the protrusion patterns 125 may be opened in the short-side direction, and closed in the long-side direction. Thus, the protrusion pattern 125 may have the air path 127 which is opened along the short-side direction.

That is, since the metal separation plate 100 for a cathode includes the protrusion patterns 125 each having the opened air path 127, the metal separation plate 100 may have its own cooling function. Thus, the metal separation plate 100 may secure excellent cooling performance and stack performance without a separate cooling plate mounted therein.

Therefore, when the fuel cell stack 400 is operated, the air introduced from a cooling fan (not illustrated) disposed at one side of the metal separation plates 100 and 300 for a cathode and anode may pass through the air paths 127 which are opened along the short-side direction. At this time, the air introduced from the cooling fan may be distributed into the air paths arranged on a straight line and the air paths 127 arranged at adjacent positions. As a result, while the air supplied from the cooling fan disposed at one side of the metal separation plates 100 and 300 for a cathode and anode passes through the air paths 127 of the protrusion patterns 125, which are designed to be opened along the short-side direction, the air may cool heat generated by an activation loss, reduction reaction or Joule heating.

Since the metal separation plate for a cathode in the fuel cell stack in accordance with the first embodiment of the present invention has the protrusion patterns each having the opened air path, the fuel cell stack can secure excellent cooling performance and stack performance without a separate cooling plate mounted therein. Furthermore, since a separate cooling plate can be omitted, the manufacturing cost and the entire volume can be reduced.

(Second Embodiment)

Figure 6:
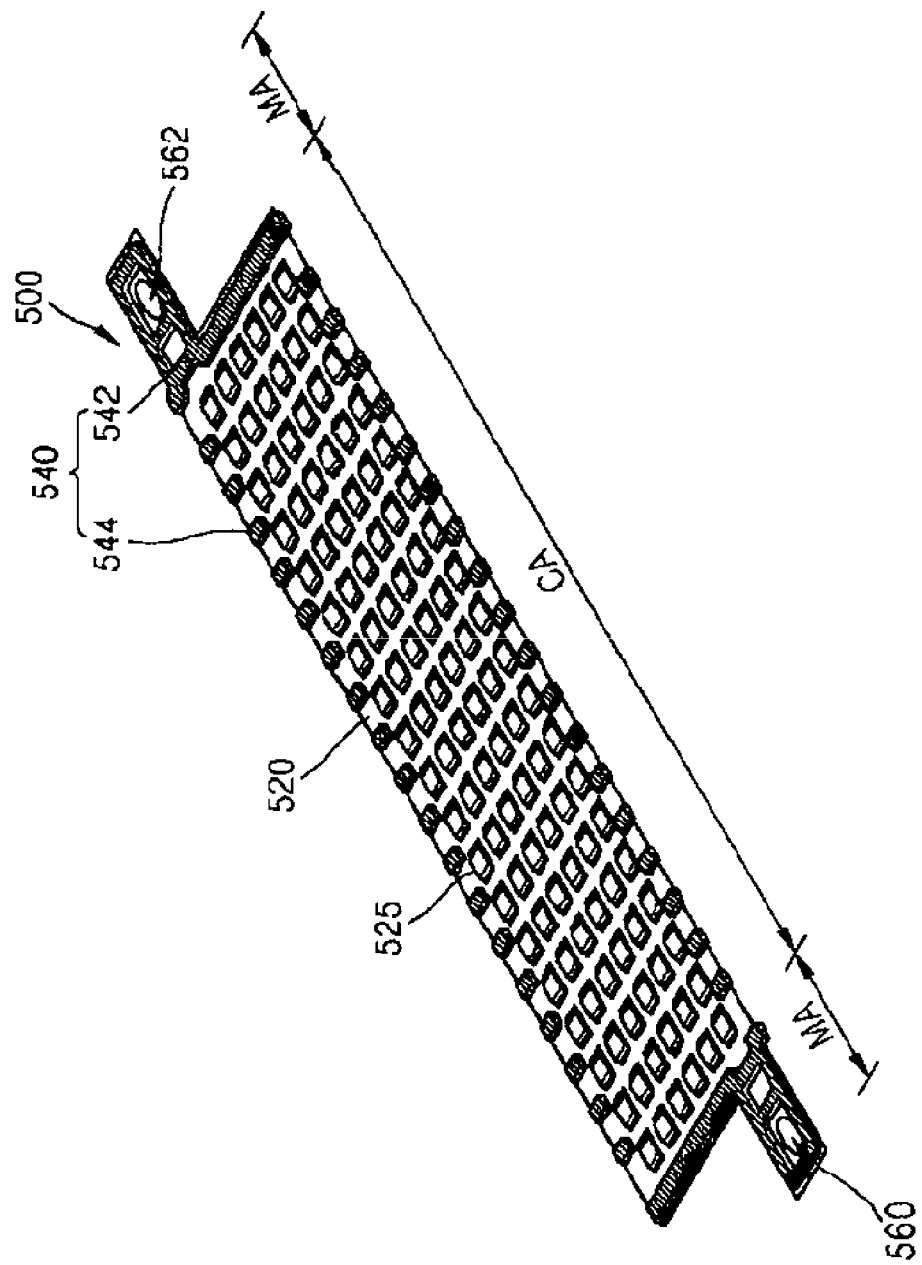
FIG. 6 is a perspective view of a metal separation plate for a fuel cell stack in accordance with a second embodiment of the present invention.
Figure 7:
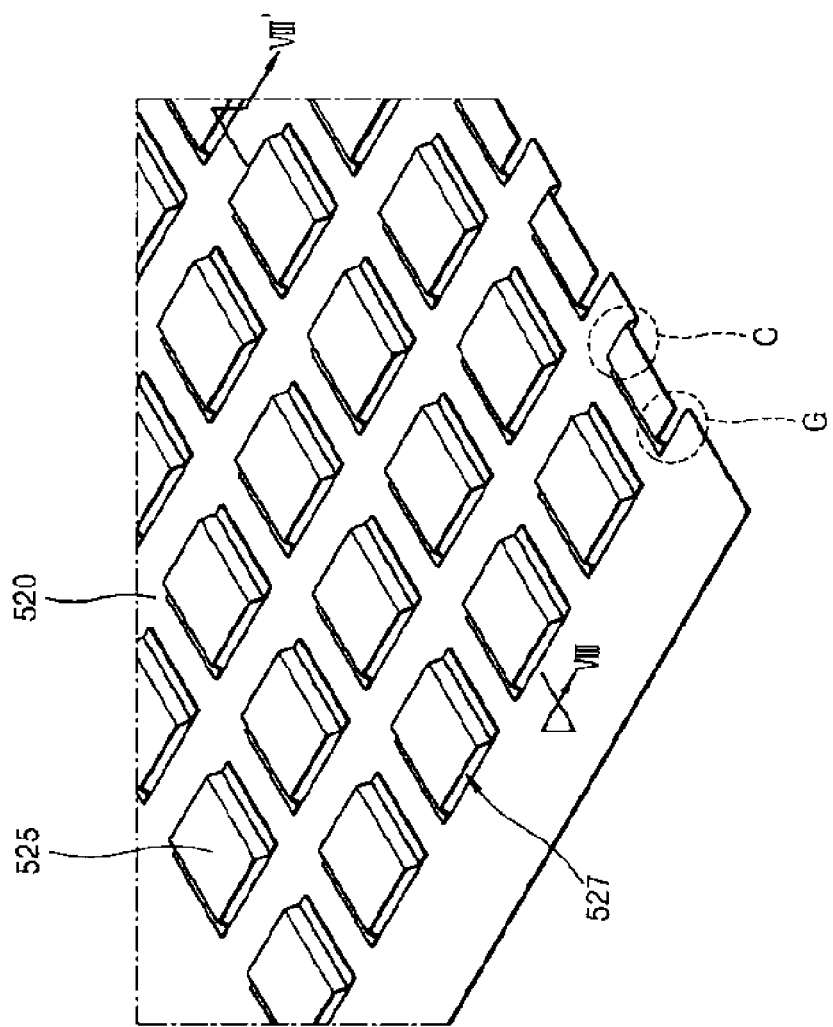
FIG. 7 is an expanded perspective view of protrusion patterns of FIG. 6.
Figure 8:
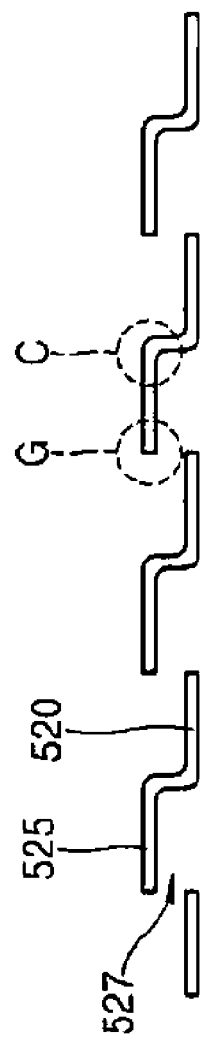
FIG. 8 is a cross-sectional view taken along line VIII-VIII' of FIG. 7.

FIG. 6 is a perspective view of a metal separation plate for a fuel cell stack in accordance with a second embodiment of the present invention, FIG. 7 is an expanded perspective view of protrusion patterns of FIG. 6, and FIG. 8 is a cross-sectional view taken along line VIII-VIII' of FIG. 7.

Referring to FIGS. 6 and 8, the metal separation plate 500 for a fuel cell stack in accordance with the second embodiment of the present invention may include a metal separation plate body 520 and a gasket 540.

The metal separation plate body 520 may include a channel part CA and a manifold part MA. The channel part CA may include protrusion patterns 525 protruding in a direction from bottom to top, separated from each other while forming a matrix shape, and partially cut to have an air path of which one side is opened along the short-side or long-side direction and the other side is closed, and the manifold part MA may include a reaction gas inlet 560 and a reaction gas outlet 562 which are disposed at both side edges of the channel part CA, respectively.

At this time, the protrusion patterns 525 each having the air path 527 may be formed in the shape of a draw bead and have a width of 3 to 5 mm. When the protrusion pattern 525 has a width of less than 3 mm, the amount of air passing through the air path 527 may be decreased to degrade the cooling performance. On the other hand, when the protrusion pattern 525 has a width of more than 5 mm, the distance between the protrusion patterns 525 may be reduced, which makes it difficult to design the patterns.

In particular, the protrusion pattern 525 has an opened portion G formed at one side thereof along the short-side or long-side direction and a closed portion C formed at the opposite side thereof. The opened portions G and the closed portions C may form a regular pattern. Thus, the air passing through the air path 527 of the protrusion pattern 525 may be introduced into the opened portion G of the protrusion pattern 525, stay in the air path 527 due to the closed portion C of the protrusion pattern 525, and be then discharged to the outside of the air path 527. As a result, the closed portion C of the protrusion pattern 525 may serve as a blocking layer which blocks moisture from leaking to the outside of the air path 527, the moisture being contained in the air which is introduced through the opened portion G of the air path 527. Thus, the closed portion C of the protrusion pattern 525 can prevent the protrusion pattern 525 from drying, thereby improving the humidification performance of the MEA (not illustrated).

The gasket 540 may serve to not only secure air tightness, but also improve the connection force and adhesive force between metal separation plates when two or more metal separation plates are stacked. The gasket 540 may be formed of rubber. However, the present embodiment is not limited thereto, but the gasket 540 may be formed of plastic.

The gasket 540 may include a first gasket 542 and second gaskets 544. The first gasket 542 may be formed along the edge of the manifold part MA on the top surface of the metal separation plate body 520, and the second gaskets 544 may be disposed at the edges of the channel part CA, and have an island structure in which the second gaskets 544 are alternately arranged with the protrusion patterns 525 At this time, the protrusion patterns 525 and the second gaskets 544 may be alternately arranged in a zigzag shape, in order to secure an introduction path of air supplied to the air paths 527. When a second gasket 544 is arranged on a straight line overlapping protrusion patterns 525, the second gasket 544 may block the introduction of air supplied to the air paths 527 of the protrusion patterns 525, thereby significantly degrading the cooling performance. Thus, the second gaskets 544 may be disposed at even intervals along the long-side direction of the metal separation plate body 520, and arranged in a zigzag shape so as not to overlap the protrusion patterns 525.

The metal separation plate for a fuel cell stack in accordance with the second embodiment of the present invention may include the protrusion patterns each having the air path of which one side is opened and the other side is closed, thereby improving the cooling performance and the stack performance. Furthermore, the metal separation plate may block moisture from leaking from the closed air paths, thereby improving the humidification performance of the MEA.

Figure 9:
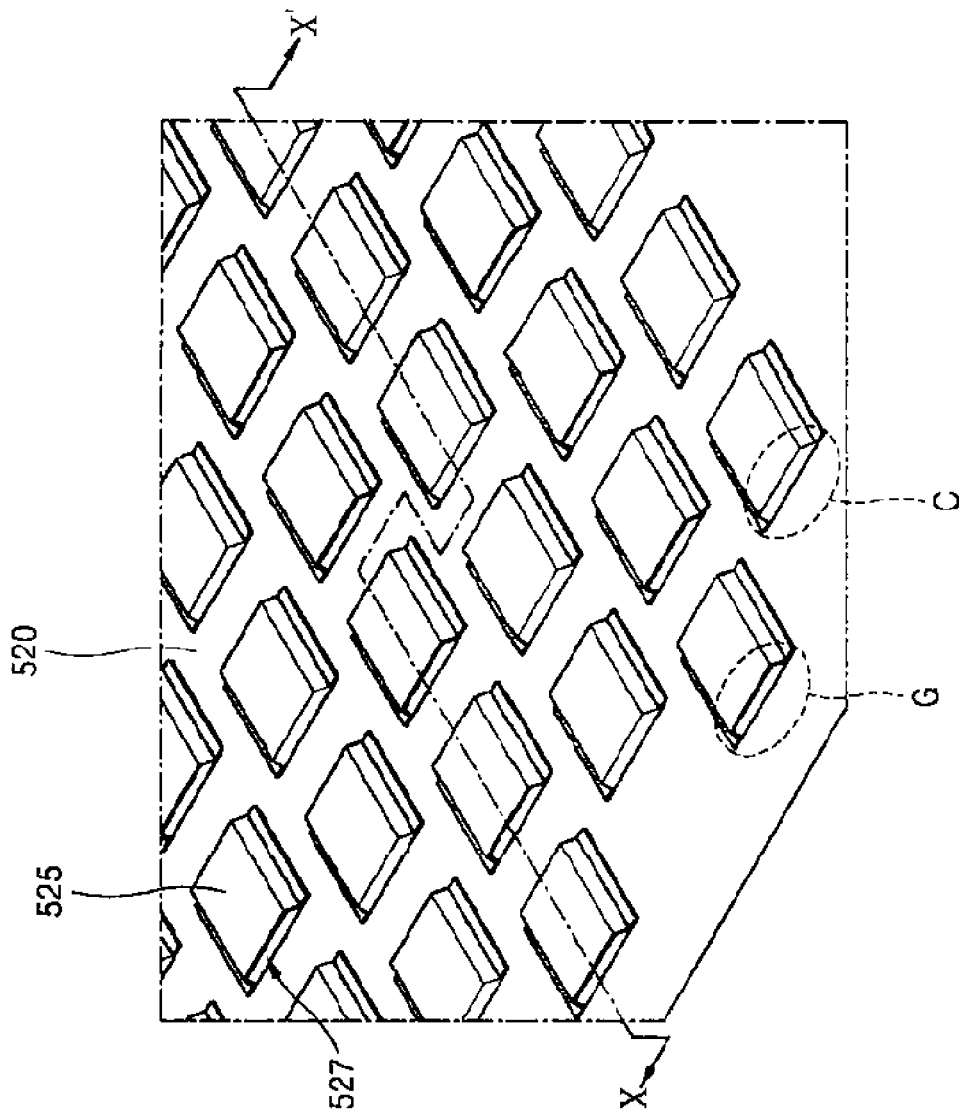
FIG. 9 is an exploded perspective view of a portion of a metal separation plate for a fuel cell stack in accordance with a modification of the second embodiment of the present invention.
Figure 10:
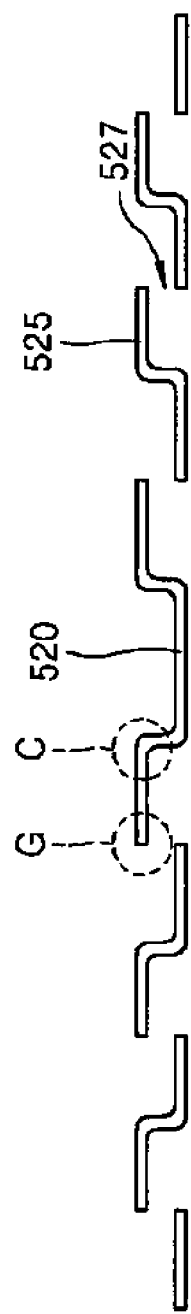
FIG. 10 is a cross-sectional view taken along line X-X' of FIG. 9.

FIG. 9 is an exploded perspective view of a portion of a metal separation plate for a fuel cell stack in accordance with a modification of the second embodiment of the present invention, and FIG. 10 is a cross-sectional view taken along line X-X' of FIG. 9.

Referring to FIGS. 9 and 10, the protrusion pattern 525 may have an opened portion G formed at one side thereof along the short-side or long-side direction and a closed portion C formed at the opposite side.

At this time, the protrusion patterns 525 may have a symmetrical structure in which an odd row of opened portions G are arranged to face the opposite direction of an even row of opened portions G and an odd row of closed portions C are arranged to face the opposite direction of an even row of closed portions C. When odd rows and even rows are symmetrically arranged, the air passing through the air paths 527 can stay in the closed portions C of the protrusion patterns 525 for a longer time, due to a vortex flow. As a result, such a structure can prevent the protrusion patterns 525 from drying, which makes it possible to improve the humidification performance of the MEA.

Although not illustrated, four protrusion patterns 525 may form one unit cell. The four protrusion patterns 525 may be arranged to face different directions, respectively. As such, when four protrusion patterns 525 are formed to face different directions, the stay time of the air can be increased by a vortex flow. Thus, the humidification performance of the MEA may be further improved.

Figure 11:
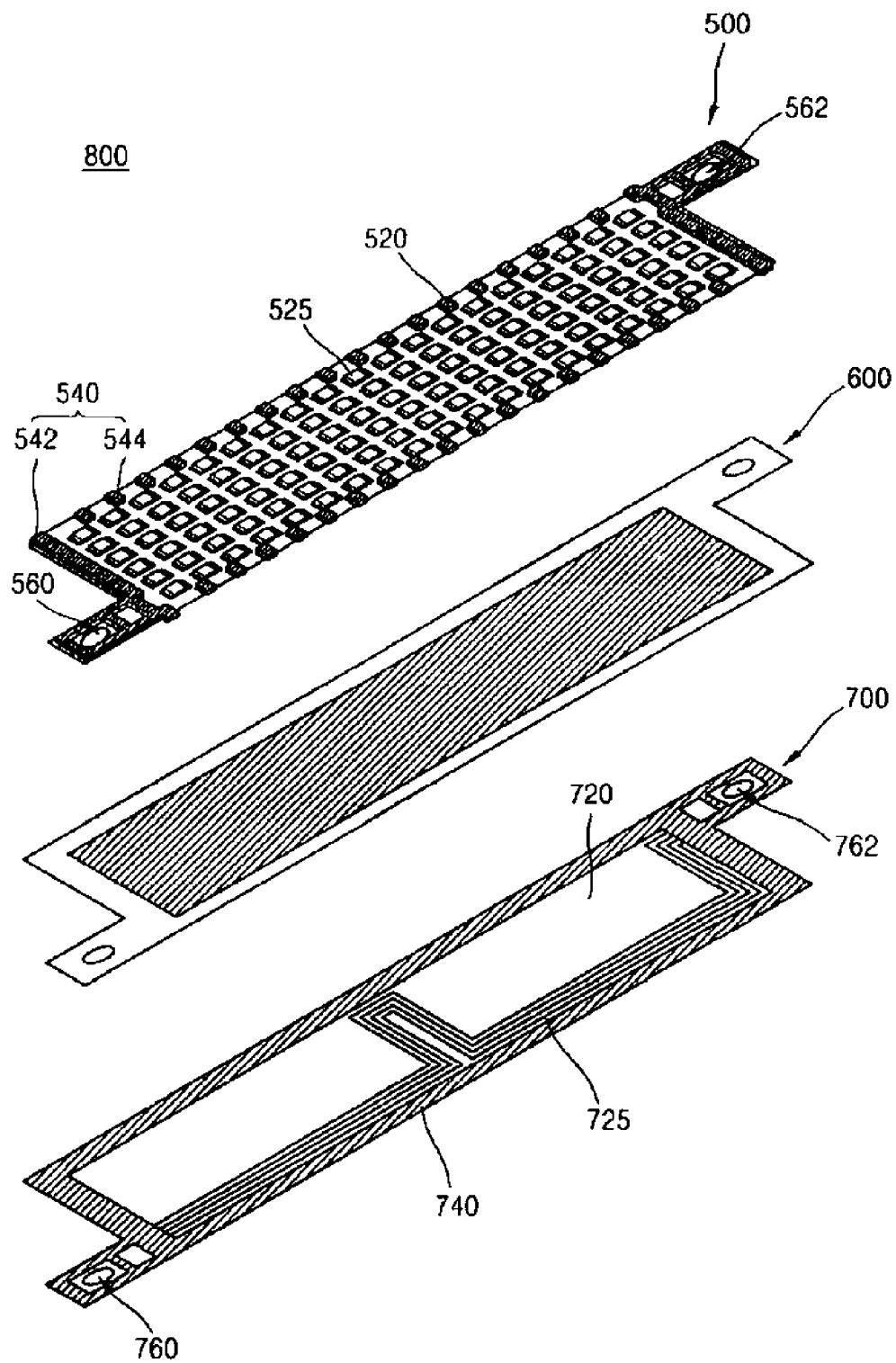
FIG. 11 is an exploded perspective view of a fuel cell stack in accordance with the second embodiment of the present invention.

FIG. 11 is an exploded perspective view of a fuel cell stack in accordance with the second embodiment of the present invention.

Referring to FIG. 11, the fuel cell stack 800 in accordance with the second embodiment of the present invention may include two or more metal separation plates and an MEA 600 interposed between the metal separation plates. At this time, the two metal separation plates may include a metal separation plate 500 for a cathode and a metal separation plate 700 for an anode.

The metal separation plate 500 for a cathode may have protrusion patterns 525 protruding in a direction from bottom to top, separated from each other while forming a matrix shape, and partially cut to have an air path opened in the short-side direction. At this time, the protrusion patterns 125 each having the air path may be formed in the shape of a draw bead and have a width of 3 to 5 mm.

Since the metal separation plate 500 for a cathode has substantially the same structure as the metal separation plate for a fuel cell stack in FIGS. 1 to 3, the detailed descriptions thereof are omitted herein.

The metal separation plate 700 for an anode may have a reaction gas flow path 725 protruding from top to bottom and formed in a shape crossing the air paths of the protrusion patterns 525. Furthermore, the metal separation plate 700 for an anode may have a reaction gas introduction manifold 760 and a reaction gas discharge manifold 762. The reaction gas introduction manifold 760 may be disposed at a position corresponding to a reaction gas inlet 560 of the metal separation plate 700 for a cathode, and the reaction gas discharge manifold 762 may be disposed at a position corresponding to a reaction gas outlet 562 of the metal separation plate 500 for a cathode.

The metal separation plate 700 for an anode may further include a gasket 740 formed along the edges of a manifold region (not illustrated) and a channel region (not illustrated). The gasket 740 may serve to not only secure air tightness, but also improve the connection force and adhesive force between the metal separation plate 500 for a cathode and the MEA 600.

The MEA 600 may be inserted between the metal separation plate 500 for a cathode and the metal separation plate 700 for an anode. The MEA 600 may include a polymer electrolyte layer and an anode and cathode which are formed on both surfaces of the polymer electrolyte layer, respectively.

Figure 12:
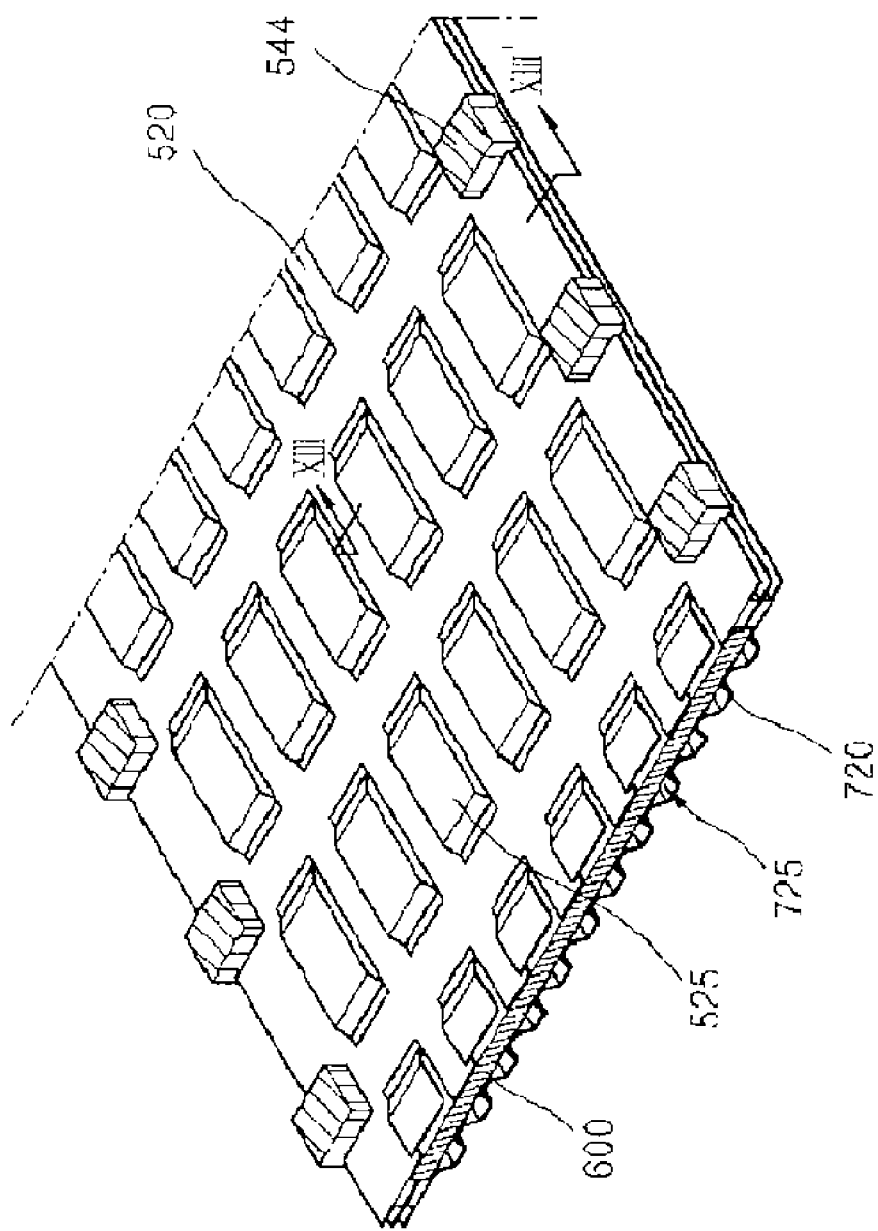
FIG. 12 is an expanded perspective view of protrusion patterns of FIG. 11.
Figure 13:
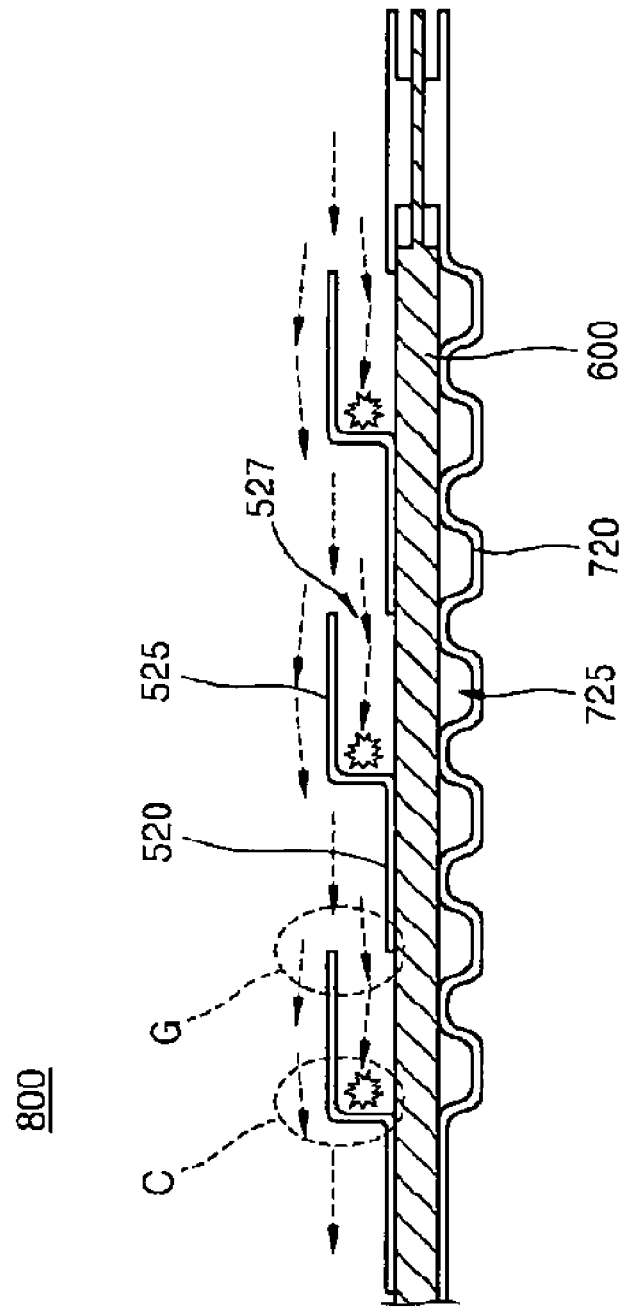
FIG. 13 is a cross-sectional view taken along line XIII-XIII' of FIG. 12.

FIG. 12 is an expanded perspective view of protrusion patterns of FIG. 11, and FIG. 13 is a cross-sectional view taken along line XIII-XIII' of FIG. 12.

As illustrated in FIGS. 12 and 13, the fuel cell stack 800 may have a structure in which the metal separation plate 700 for an anode, the MEA 600 and the metal separation plate 500 for a cathode are sequentially stacked. At this time, the reaction gas flow paths 725 of the metal separation plate 700 for an anode may be arranged in a shape crossing the air paths 527 of the metal separation plate 500 for a cathode.

At this time, the metal separation plate 500 for a cathode may include the protrusion patterns 525 each having the air path 527 of which one side is opened along the short-side direction and the other side is closed. The protrusion pattern 525 may have an opened portion G formed at one side thereof along the short-side or long-side direction and a closed portion C formed at the opposite side.

That is, among the four sides of the protrusion pattern 525, three sides may be closed, and only the rest side may be opened.

That is, since the metal separation plate 500 for a cathode includes the protrusion patterns 525 each having the air path 527 of which one side is opened and the other side is closed, the metal separation plate 500 may have its own cooling function. Thus, the metal separation plate 500 for a cathode may secure excellent cooling performance and stack performance without a separate cooling plate mounted therein.

Furthermore, the closed portion C of the protrusion pattern 525 in the metal separation plate 500 for a cathode may serve as a blocking layer which blocks moisture from leaking to the outside of the air path 527, the moisture being contained in the air introduced through the opened portion G of the air path 527. As a result, the closed portion C can prevent the protrusion pattern 525 from drying, thereby improving the humidification performance of the MEA.

Thus, when the fuel cell stack 800 is operated, the air introduced from a cooling fan (not illustrated) disposed at one side of the metal separation plates 500 and 700 for a cathode and anode may pass through the air paths 527 of which one side is opened along the short-side or long-side direction and the other side is closed. At this time, the air introduced from the cooling fan may be distributed to the air paths 527 which are partially opened and passed through the air paths 527. Then, when the air is introduced to the closed portions C of the protrusion patterns 525, the air may be discharged after staying around the closed portions C.

As a result, while the air supplied from the cooling fan disposed at one side of the metal separation plates 500 and 700 for a cathode and anode passes through the air paths 527 of the protrusion patterns 525, the air may cool heat generated by an activation loss, reduction reaction or Joule heating. Furthermore, the air passing through the opened portions G may stay around the closed portions C due to a vortex flow caused by the closed portions C of the protrusion patterns 525, thereby preventing the protrusion patterns 525 from drying. Thus, the humidification performance of the MEA 600 can be improved.

Since the fuel cell stack in accordance with the second embodiment of the present invention includes the protrusion patterns each having the flow path of which one side is opened and the other side is closed, the reaction gas can be smoothly supplied, and the cooling performance can be improved, thereby improving the stack performance. Furthermore, the fuel cell stack may block moisture from leaking from the air paths, thereby improving the humidification performance of the MEA.

Furthermore, since the fuel cell stack in accordance with the second embodiment of the present invention includes the protrusion patterns each having the air path which is partially opened, the fuel cell stack can secure excellent cooling performance and stack performance without a separate cooling plate mounted therein. Furthermore, since a separate cooling plate can be omitted, the manufacturing cost and the entire volume can be reduced.

Furthermore, the fuel cell stack in accordance with the second embodiment of the present invention can be applied to not only the air-cooled structure, but also the water-cooled structure.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. A metal separation plate for a fuel cell stack, comprising:
   a metal separation plate body comprising: a channel part having protrusion patterns protruding in a direction from bottom to top, separated from each other while forming a matrix shape, and partially cut to have an air path opened in a short-side direction; and a manifold part having a reaction gas inlet and a reaction gas outlet which are disposed at both side edges of the channel part, respectively; and
   a gasket comprising: a first gasket formed along the edge of the manifold part on the top surface of the metal separation plate body; and second gaskets disposed at the edge of the channel part and having an island structure in which the second gaskets are alternately arranged with the protrusion patterns.

2. The metal separation plate of claim 1, wherein the protrusion patterns and the second gaskets are alternately arranged in a zigzag shape, in order to secure an introduction path of air supplied to the air path.

3. The metal separation plate of claim 1, wherein the protrusion patterns each having the air path are formed in the shape of draw bead and have a width of 3 mm to 5 mm.

4. A fuel cell stack comprising:
   a cathode-side metal separation plate for a cathode;
   an anode-side metal separation plate for an anode; and
   a membrane electrode assembly (MEA) interposed between the cathode-side metal separation plate and the anode-side metal separation,
   wherein the cathode-side metal separation plate has protrusion patterns protruding in a direction from bottom to top, separated from each other while forming a matrix shape, and partially cut to have an air path formed by the protrusion patterns opened in a short-side direction, the protrusion patterns being formed in the shape of draw bead and having a width of 3 mm to 5 mm, and
   wherein the anode-side metal separation plate has a reaction gas flow path protruding in a direction from top to bottom, and formed along the long-side direction crossing the air paths of the protrusion patterns.

5. A metal separation plate comprising:
   a metal separation plate body comprising: a channel part having protrusion patterns protruding in a direction from bottom to top, separated from each other while forming a matrix shape, and partially cut to have an air path of which one side is opened along a short-side or long-side direction and the other side is closed; and a manifold part having a reaction gas inlet and a reaction gas outlet which are disposed at both side edges of the channel part, respectively; and
   a gasket comprising: a first gasket formed along the edge of the manifold part on the top surface of the metal separation plate body; and second gaskets disposed at the edge of the channel part and having an island structure in which the second gaskets are alternately arranged with the protrusion patterns.

6. The metal separation plate of claim 5, wherein each of the protrusion patterns has an opened portion formed at one side thereof along the short-side or long-side direction and a closed portion formed at the opposite side, and the opened portions and the closed portions are arranged to form a regular pattern.

7. The metal separation plate of claim 6, wherein the protrusion patterns are arranged in such a manner that odd rows of opened portions and closed portions and even rows of opened portions and closed portions, which are arranged along the short-side or long-side direction, face the same direction.

8. The metal separation plate of claim 6, wherein the protrusion patterns have a symmetrical structure in which odd rows of opened portions are arranged to face the opposite direction of even rows of opened portions, and the odd rows of closed portions are arranged to face the opposite direction of the even rows of closed portions.

9. The metal separation plate of claim 6, wherein four protrusion patterns form one unit cell, and are arranged to face different directions.

10. The metal separation plate of claim 5, wherein the protrusion patterns and the second gaskets are alternately arranged in a zigzag shape, in order to secure an introduction path of air supplied to the air paths.

11. A fuel cell stack comprising:
    a cathode-side metal separation plate for a cathode;
    an anode-side metal separation plate for an anode; and
    an MEA interposed between the cathode-side metal separation plate and the anode-side metal separation plate,
    wherein the cathode-side metal separation plate has protrusion patterns each having an air path formed by the protrusion patterns of which one side is opened in a short-side or long-side direction and the other side is closed, the protrusion patterns being formed in the shape of draw bead and having a width of 3 mm to 5 mm, and
    wherein the anode-side metal separation plate has a reaction gas flow path protruding from top to bottom, and formed in a shape crossing the air paths of the protrusion patterns.

12. The fuel cell stack of claim 11, wherein the fuel cell stack has an air-cooled structure or water-cooled structure.

* * * * *